United States Patent
Svensson et al.

(10) Patent No.: US 8,198,750 B2
(45) Date of Patent: Jun. 12, 2012

(54) BATTERY UNIT ARRANGEMENT FOR HIGH VOLTAGE APPLICATIONS, CONNECTOR AND DISCONNECTOR ARRANGEMENT AND METHOD

(75) Inventors: Jan R. Svensson, Vasteras (SE); Bertil Nygren, Vasteras (SE); Falah Hosini, Vasteras (SE); Gerhard Brosig, Vasteras (SE); Gunnar Russberg, Vasteras (SE); Willy Hermansson, Vasteras (SE)

(73) Assignee: ABB Research Ltd. (CH)

( * ) Notice: Subject to any disclaimer, the term of this patent is extended or adjusted under 35 U.S.C. 154(b) by 1 day.

(21) Appl. No.: 12/969,203

(22) Filed: Dec. 15, 2010

(65) Prior Publication Data

US 2011/0140529 A1    Jun. 16, 2011

Related U.S. Application Data

(63) Continuation of application No. PCT/EP2008/058411, filed on Jun. 30, 2008.

(51) Int. Cl.
 *B60L 1/00* (2006.01)
(52) U.S. Cl. .......................................... 307/9.1
(58) Field of Classification Search ............... 307/9.1
 See application file for complete search history.

(56) References Cited

U.S. PATENT DOCUMENTS

| 4,585,713 A | 4/1986 | Pathëet al. |
| 5,534,364 A | 7/1996 | Watanabe et al. |

FOREIGN PATENT DOCUMENTS

| GB | 2199704 A | 7/1988 |
| GB | 2321749 A | 8/1998 |

OTHER PUBLICATIONS

International Search Report and Written Opinion of the International Searching Authority; PCT/EP2008/058411; Nov. 10, 2008; 11 pages.

*Primary Examiner* — Robert L. Deberadinis
(74) *Attorney, Agent, or Firm* — St. Onge Steward Johnston & Reens LLC

(57) ABSTRACT

A battery unit arrangement for high voltage applications. The battery unit arrangement includes a battery unit having a battery chassis, and a switching device. The switching device includes switching mechanism for switching the battery chassis between two positions, a first position connecting the battery chassis to a pole of the battery unit, and a second position connecting the battery chassis to a zero potential. The invention also relates to a connection and disconnection arrangement and methods for operating such connection and disconnection arrangement.

17 Claims, 2 Drawing Sheets

US 8,198,750 B2

BATTERY UNIT ARRANGEMENT FOR HIGH VOLTAGE APPLICATIONS, CONNECTOR AND DISCONNECTOR ARRANGEMENT AND METHOD

CROSS-REFERENCE TO RELATED APPLICATIONS

The present application is a continuation of pending International patent application PCT/EP2008/058411 filed on Jun. 30, 2008, which designates the United States and the content of which is incorporated herein by reference.

FIELD OF THE INVENTION

The invention relates generally to the field of electric power transmission networks, and in particular to aspects of service and maintenance in power transmission networks.

BACKGROUND OF THE INVENTION

In electrical power transmission networks accidental contact with high voltage will usually result in severe injury or even death. High security requirements are therefore stipulated throughout such networks.

DC circuit breakers are one security measure conventionally used for, among other things, connecting and disconnecting DC voltage storages connected to a voltage source converter. Such voltage sources comprise battery units designed so that included battery isolation is able to handle a certain breakdown voltage. However, insulation breakdown may still occur resulting in high fault currents between battery cells and battery chassis (cabinet) under voltage application.

A DC voltage storage suitable for use with a voltage source converter handling high voltages often need to comprise several battery units connected in series and forming a battery string, e.g. in transmission and distribution systems the total battery voltage can be in the order of several 10 kV's. The battery string of such DC voltage source will be on high potential even when DC breakers of the DC busbar are opened. Obviously, such high voltage and large amount of energy in the battery string makes it very dangerous for service and maintenance work of the batteries even when they are disconnected from the voltage source converter.

The improvement of the security in high-voltage networks is a continuing strive and in view of this it would be desirable to provide improved security particular in regards of above-described battery storage setups.

SUMMARY OF THE INVENTION

It is a general object of the present invention to provide means for ensuring secure service and maintenance work of DC voltage storages.

It is a particular object of the present invention to provide means for ensuring safe service and maintenance work on individual battery energy storages arranged in battery strings.

These objects, among others, are achieved by a battery unit arrangement for high voltage applications, by a connector and disconnector arrangement and by a method as claimed in the appended independent claims.

In accordance with the invention, a battery unit arrangement for high voltage applications is provided. The battery unit arrangement comprises a battery unit having a battery chassis. The battery unit arrangement further comprises a switching device, which comprises switching means for switching the battery chassis between two positions. In a first position the battery chassis is connected to a pole of the battery unit, and in a second position the battery chassis is connected to a secure zero potential. By means of the invention the security for service and maintenance personal can be greatly increased in a cost-efficient way. In operative mode the chassis of the battery is connected to one of the battery poles (negative or positive). Thereby the potential of the chassis is always at a defined level relative to the inner battery cells and the voltage across the insulation is defined to a level below its electrical breakdown. If the chassis is not connected to one of the battery poles the chassis potential may be undefined and the voltage across the battery insulation could reach very high levels causing a breakdown of the insulation in the battery unit. This potential control of the chassis will work in a similar way regardless of if the chassis is connected to either the negative or positive battery pole. The invention provides means for controlling the potential of the battery chassis. The potential control in turn enables the provision of a secure working environment.

The invention also provides a connector and disconnector arrangement and related methods, wherein advantages similar to the above are achieved. In particular, the connector and disconnector arrangement comprises a number of battery unit arrangements, and further breaker devices. The connector and disconnector arrangement enables individual disconnection of the battery units. Service and maintenance can thereby be performed on the battery units individually.

DETAILED DESCRIPTION OF THE INVENTION

Figure 1:
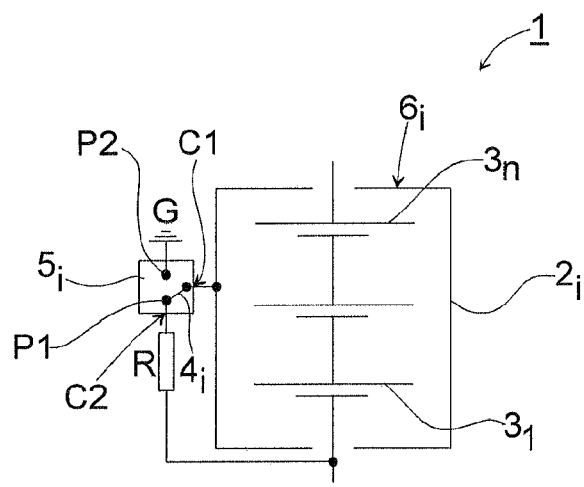
FIG. 1 illustrates the invention shown for a single battery unit.

Reference is first made to FIGS. 1 and 2 to describe the general layout of a battery energy storage for which the present invention is applicable. A battery unit arrangement 1 comprises a battery unit $6_i$. The battery unit $6_i$ in turn comprises a battery chassis (also denoted cabinet or enclosure) 2 and a number of series-connected battery cells $3_1, \ldots, 3_n$. Several such battery cells may also be grouped together in series and/or parallel to form a battery module (not shown in the figure). Several battery modules may be series-connected (or in combinations of series and parallel connections) to form the battery unit $6_i$, and the battery units $6_i$ in turn may be series-connected to form a battery string 7.

The one or more battery strings 7 are connected electrically in parallel across common busbars 8a, 8b to provide active power to load, such as a voltage source converter (not shown). Depending on for example power levels of the load and the desired duration of the battery energy source arrangement, a suitable number of battery strings 7 are connected in parallel to provide the necessary power and energy. In the present application, the battery strings 7 are high-voltage battery strings and an increased need of active power can be met by adding a suitable number of parallel-connected battery strings (only one battery string illustrated in the figures). Each battery string 7 is connected in parallel with the load, for example the voltage source converter. Also in order to achieve the required high DC-voltage the battery string 7 is made up of a necessary number of series connected cells, e.g. reaching a DC-voltage of 40 kV would need 10 000 battery cells in series if the cell voltage is 4 V.

FIG. 1 illustrates a basic principle of the present invention. As mentioned earlier, the battery string 7 will be on high potential even when DC breakers 9a, 9b connected to the DC busbar 8a, 8b are opened. In order to eliminate the risks connected with having service and maintenance work done on battery storages for high voltage applications, a switching device $5_i$ is introduced in accordance with the invention.

Figures 2A, 2B:
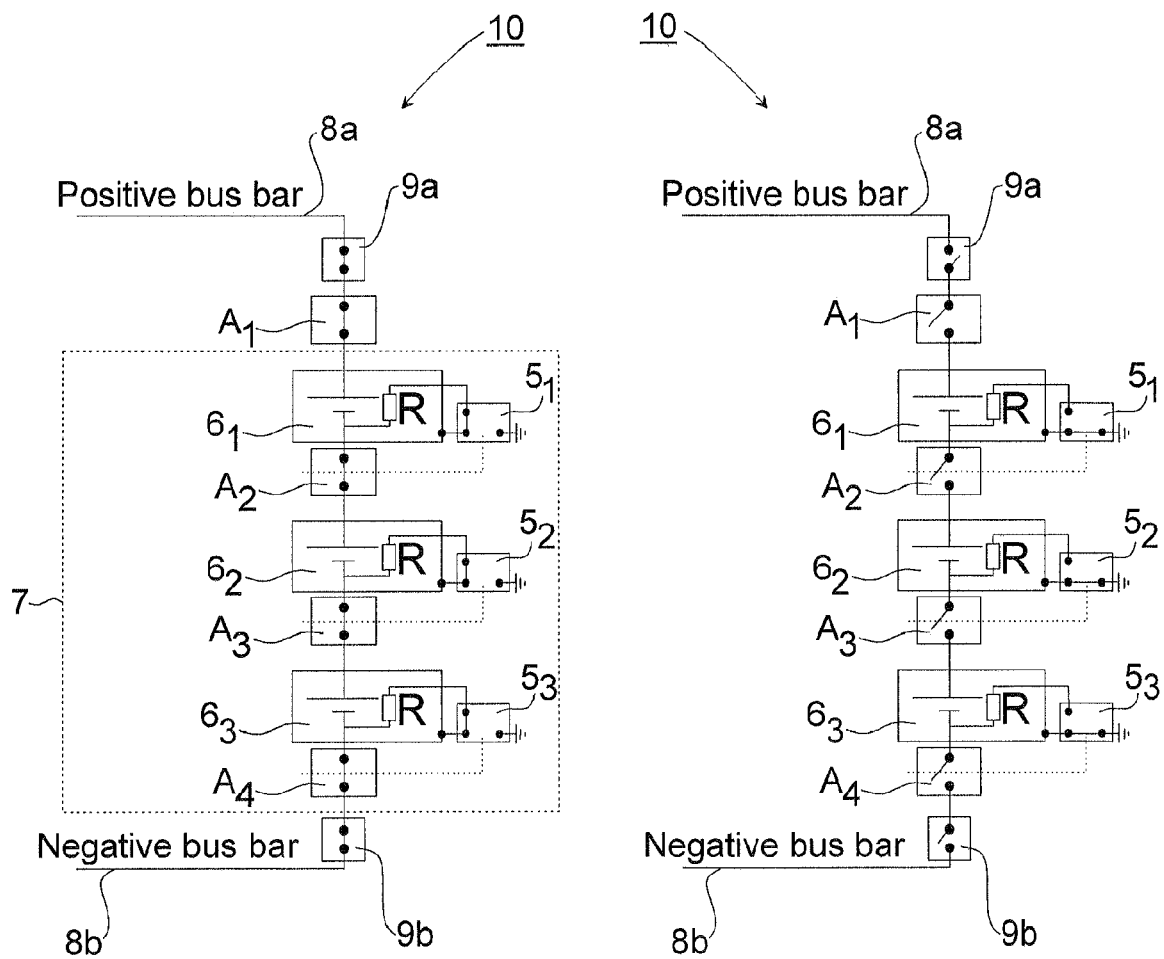
FIG. 2a illustrates the inventive battery arrangement in an operative state.
FIG. 2b illustrates the inventive battery arrangement in a disconnected state.

The switching device $5_i$ comprises switching means $4_i$ for switching between two positions, P1 and P2. When the switching means $4_i$ is in the position illustrated in the figure, position P1, the battery chassis $2_i$ of the battery unit $6_i$ is connected to the negative pole of the battery unit $6_i$. A similar arrangement for the battery unit with position P1 connecting the battery chassis $2_i$ to the positive battery pole could also be used giving the same principle functionality, but here the example for the case of connecting to the negative pole is shown. The negative pole of the battery unit $6_i$ is connected to the switching device $5_i$ via a current limiting resistor R, for example a 1 MΩ or 10 MΩ resistor. The connection can in principle be made without the resistor thereby connecting the chassis directly to the battery pole. However if there will be an insulation failure inside the battery unit $6_i$ this could then result in a high current shorting the battery and that could eventually destroy the battery unit. A high resistor value will limit such short circuit currents to harmless levels. In practice, the resistor R is preferably connected within the battery chassis $2_i$ (as illustrated in FIGS. 2a and 2b), but is in FIG. 1 illustrated outside the battery chassis $2_i$. When the switching means $4_i$ is in its second position, P2, the battery chassis 2 is connected to ground G.

The switching device $5_i$ further comprises connection means, for example first connection means C1 for connecting the switching device $5_i$ to the battery chassis $2_i$ and second connection means C2 for connecting the switching device $5_i$ to the negative pole (or to the positive pole if this arrangement is used) of the battery unit $6_i$.

The switching device $5_i$ thus comprises means for connecting and disconnecting the battery chassis $2_i$ to and from ground G, i.e. to and from a secure zero electrical potential.

A connector and disconnector arrangement 10 in accordance with the invention comprises a number of switching devices $5_i$, one for each battery unit $6_i$ of the battery string 7. The connector and disconnector arrangement 10 in accordance with the invention further comprises breaker devices $A_i$ connected between each battery unit $6_i$, i.e. connected from one pole of the battery unit $6_i$ to the opposite pole of the adjacent battery unit $6_{i+1}$ and so on. Further, breaker devices $A_i$ are also connected between both ends of the battery string 7 and a load to which the battery load 7 is connected, i.e. connected from one pole of battery unit $6_1$ to the load, and from one pole of battery unit $6_n$ to the load.

The operation of the connector and disconnector arrangement 10 in accordance with the invention will be described in the following with reference to FIGS. 2a and 2b. The figures illustrate a battery string 7 comprising three battery units $6_1$, $6_2$, $6_3$. The invention can however be used for as many battery units or battery modules as desired and needed.

In accordance with the invention, breaker devices $A_1$, $A_2$, $A_3$, $A_4$ are connected between the DC breaker 9a and the first battery unit $6_1$ of the battery string 7, between the first battery unit $6_1$ and the second battery unit $6_2$, between the second battery unit $6_2$ and the third battery unit $6_3$ and between the third battery unit $6_3$ and the DC breaker 9b, respectively. Each battery unit $6_i$ comprises a switching device $5_i$ described earlier with reference to FIG. 1.

FIG. 2a illustrates the case when the battery string 7 is in operation. The breaker devices $A_1$, $A_2$, $A_3$, $A_4$ between each battery unit $6_i$ are closed for series connection of the battery units $6_i$. The DC breakers 9a, 9b are also closed for connection of the battery string 7 to the DC busbars 8a, 8b. The switching devices $5_1$, $5_2$, $5_3$ connect the negative pole of its respective battery unit $6_1$, $6_2$, $6_3$ to the respective battery chassis $2_1$, $2_2$, $2_3$ thereby securing the potential distribution. A similar arrangement could also be used having the switching devices $5_1$, $5_2$, $5_3$ connect the positive pole of its respective battery unit to the respective chassis.

FIG. 2b illustrates the case when the battery string 7 is in a non-operative, disconnected state. In this state, secure service and maintenance work can be performed. The breaker devices $A_1$, $A_2$, $A_3$, $A_4$ between each battery unit $6_1$, $6_2$, $6_3$ are opened for disconnection of the battery units $6_1$, $6_2$, $6_3$ and the DC breakers 9a, 9b are also opened for disconnection of the battery string 7 from the DC busbars 8a, 8b. The switching devices $5_1$, $5_2$, $5_3$ are switched so as to connect the battery chassis $2_1$, $2_2$, $2_3$ of each battery unit $6_1$, $6_2$, $6_3$ to secure zero potential. In this position the switching devices $5_1$, $5_2$, $5_3$ thus enable safe service and maintenance work on each individual battery unit $6_1$, $6_2$, $6_3$. It is noted that the battery units $6_1$, $6_2$, $6_3$ are separately disconnected and service work can be performed separately on each battery unit $6_1$, $6_2$, $6_3$.

As mentioned, there may be as many battery units or battery modules as desired and needed in a battery string 7, and each battery unit $6_i$ comprises a switching device $5_i$ and breaker devices A(i), A(i+1) connected in the corresponding manner as described above.

The switching between the operative mode (FIG. 2a) and the non-operative mode (FIG. 2b) is performed in a synchronized manner. The switching does not need to be performed simultaneously. That is, when the non-operative mode should be entered, the connection and disconnection of the switching device $5_i$ and the breaker device $A_i$, respectively, is synchronized so that when the breaker devices are opened, the switching devices should connect the battery chassis 2 to ground. Inversely, when the operative mode should be entered, the switching devices are connected to the negative poles of their respective battery units and then (if not simultaneously) the battery units are connected in series by closing the breaker devices.

Figure 3:
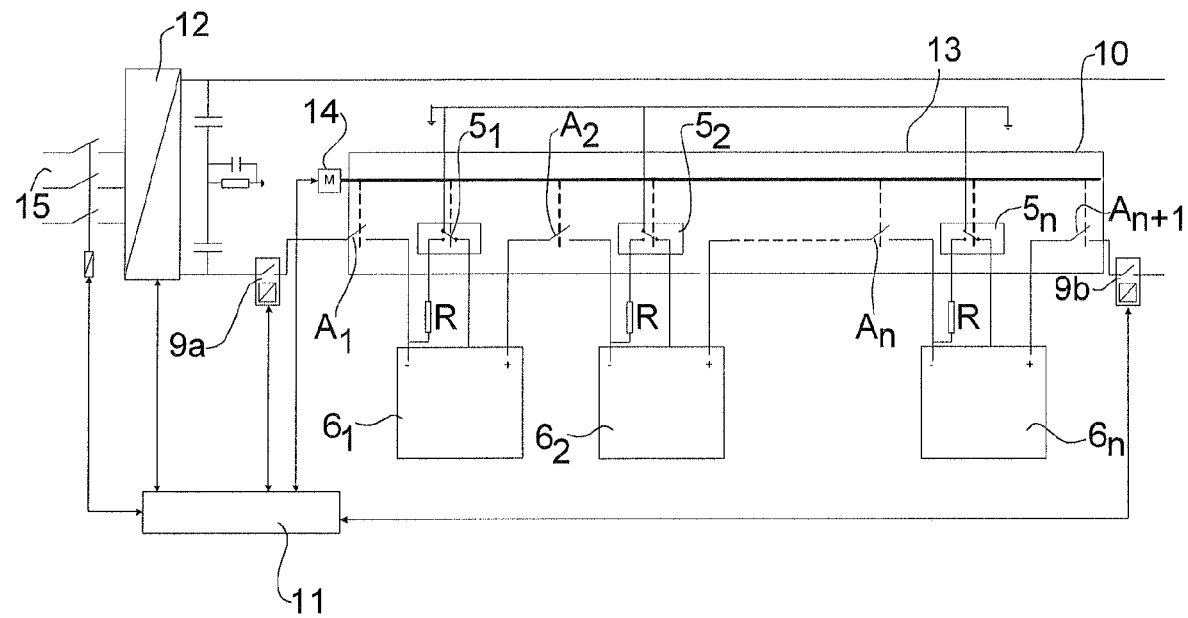
FIG. 3 illustrates schematically an example of the inventive battery arrangement in a converter system.

FIG. 3 illustrates an exemplary use of the battery unit arrangement 1 and the connector and disconnector arrangement 10 in accordance with the invention. The battery string 7, comprising n battery units $6_i$ connected in series, is connected in parallel to a voltage source converter 12. The voltage source converter 12 is connected to a three-phase power network 15. In the figure two DC breakers corresponding to the DC breakers 9a, 9b of FIGS. 2a, 2b are shown at each end of the battery string 7, but the number of breakers is not important for the invention. In the figure only one string is shown for clarity of the principle, but it will be the same principle for several strings in parallel also.

To accomplish the synchronized connection and disconnection of the connector and disconnector arrangement 10 in accordance with the invention a number of different solutions are conceivable. For example, a mechanical solution can be utilized, wherein a bar 13 comprising a set of connecting contacts are utilized for the breaker devices Ai. The contacts are arranged to accomplish the connection and disconnection. The bar 13 is arranged to be turned, for example by means of linear motor 14, between the two operation modes. In a first mode the connector and disconnector arrangement 10 is connected so that the battery string 7 is in the operative mode. In particular, the contacts of the bar 13 connect each breaker device Ai to the operative mode, shown in FIG. 2a. In a second mode the connector and disconnector arrangement 10 is connected so as to provide a safe zero potential. In particular, in the second mode the contacts connect each breaker device Ai to the non-operative mode, shown in FIG. 2b. Instead of the bar and the linear motor other types of electro-mechanical devices can be used to achieve the same effect.

A control system 11 controls the operation of the connector and disconnector arrangement 10 in accordance with the invention. The control system 11 comprises means, e.g. software, for performing a synchronized switching of the switching devices $5_i$ and the breaker devices Ai. The control system 11 comprises additional functions, for example supervising the functions by monitoring relevant parameters and providing alarms at fault conditions, and additional functions known in the art. The control system 11 typically also monitors and controls the battery operation, the DC-breakers 9a, 9b as well as the voltage source converter.

Figure 4:
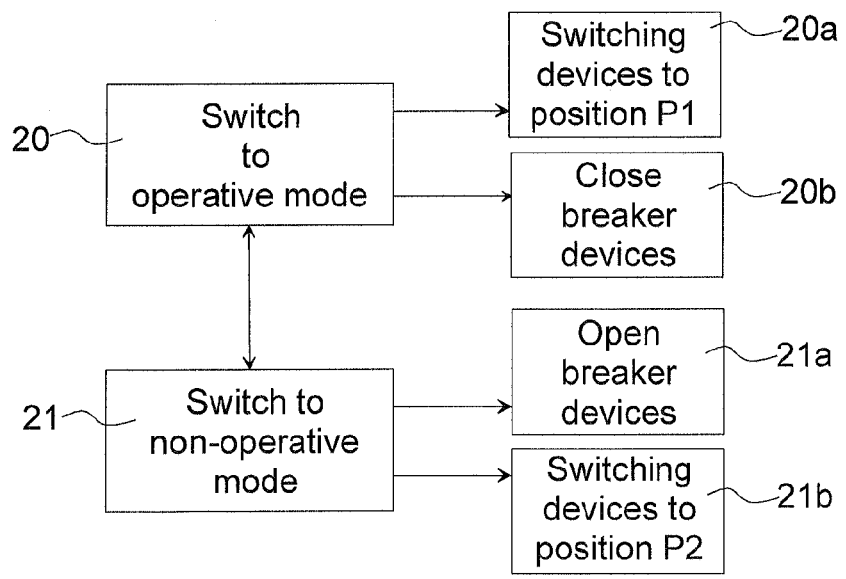
FIG. 4 illustrates steps of the method in accordance with the invention.

With reference to FIG. 4, the invention also encompasses a method for operating a connector and disconnector arrangement 10 as described above. The method comprises the steps of switching the connector and disconnector arrangement 10 between an operative mode and a non-operative mode.

In step 20, the connector and disconnector arrangement 10 is switched to the operative mode, described earlier. The switching to the operative mode comprises the substeps of: switching 20a the switching devices $5_1, \ldots, 5_n$ to the earlier described position P1; and closing 20b the breaker devices $A_1, \ldots, A_{n+1}$, whereby the battery units $6_1, \ldots, 6_n$ are series connected. Thereby the negative pole (or the positive pole if this arrangement is used) of their respective battery unit $6_1, \ldots, 6_n$ is connected to the battery chassis $2_1, \ldots, 2_n$ of their respective battery unit $6_1, \ldots, 6_n$. The connector and disconnector arrangement 10 is now in the operative mode.

In step 21, the connector and disconnector arrangement 10 is switched to a non-operative mode. The switching to the non-operative mode comprises the substeps of: opening 21a the breaker devices $A_1, \ldots, A_{n+1}$, whereby the battery units $6_1, \ldots, 6_n$ are disconnected from each other; and switching 21b the switching devices $5_1, \ldots, 5_n$ to the earlier described position P2. Thereby the battery chassis $2_1, \ldots, 2_n$ of each respective battery unit $6_1, \ldots, 6_n$ is connected to a secure zero potential, i.e. to ground.

The sub-steps 20a, 20b and 21a, 21b of the operative mode and the non-operative mode, respectively, are preferably performed in a synchronized manner.

The method may comprise further steps. For example, if the connector and disconnector arrangement 10 further comprises DC breakers 9a, 9b, then the method comprises the additional step of closing, in the operative mode, the DC breakers 9a, 9b after the step of closing the breaker devices $A_i$.

It is noted that the DC breakers 9a, 9b are designed to be able to break the operating current, and are opened before the breaker devices $A_i$ are opened and also before the switching devices $5_i$ are switched. Therefore, the breaker devices $A_i$ need not be able to break a high DC current and can be dimensioned accordingly. In particular, less expensive components can be used and a cost-effective total cost for the connector and disconnector arrangement 10 can be provided.

Instead of using mechanical or electro-mechanical breakers and connector and disconnector arrangements also in principle semiconductor switching devices could be used. However in order to achieve a true galvanic safe separation and disconnection of the batteries from the converter and separate the battery units from the string the mechanical and electro-mechanical devices is a preferred solution.

What is claimed is:

1. A battery unit arrangement for high voltage applications, said battery unit arrangement comprising a battery unit having a battery chassis characterized by a switching device comprising switching mechanism for switching said battery chassis between two positions, a first position connecting said battery chassis ($2_i$) to a pole of said battery unit and a second position connecting said battery chassis to a zero potential.

2. The battery unit arrangement as claimed in claim 1, wherein said switching device comprises a first connection mechanism connectable to said battery chassis and a second connection means connectable to said pole of said battery unit.

3. The battery unit arrangement as claimed in claim 1, further comprising a resistor connected at one end to a connection means of said switching device and at another end to the pole of said battery unit.

4. The battery unit arrangement as claimed in claim 3, wherein said resistor is connected within said battery chassis.

5. The battery unit arrangement as claimed in claim 1, wherein said battery unit comprises a number of series-connected battery cells, or combinations of series and parallel-connected cells.

6. A connector and disconnector arrangement comprising at least two battery unit arrangements as claimed in claim 1, characterized by
    a first breaker device connected to a load and to a first battery unit of said at least two battery unit arrangements,
    a second breaker device connected to said first battery unit and to a second battery unit of said at least two battery unit arrangements, and
    a third breaker device connected to said second battery unit and to said load.

7. The connector and disconnector arrangement as claimed in claim 6, wherein said first breaker device is connected to said load via a DC breaker.

8. The connector and disconnector arrangement as claimed in claim 7, further comprising control mechanism controlling the DC-breakers.

9. The connector and disconnector arrangement as claimed in claim 6, wherein said third breaker device is connected to said load via a DC breaker.

10. The connector and disconnector arrangement as claimed in claim 1, comprising further battery units connected in series to each other via a respective breaker device.

11. The connector and disconnector arrangement as claimed in claim 1, further comprising control mechanism for connecting said breaker devices and said switching devices of said at least two battery unit arrangements in a synchronized manner.

12. The connector and disconnector arrangement as claimed in claim 1, wherein said load comprises a voltage source converter.

13. A method for operating a connector and disconnector arrangement as claimed in claim 1, the method being characterized by the steps of:
    upon operation, switching said connector and disconnector arrangement to an operative mode by
        closing said breaker devices, thereby series connecting said battery units, and
        switching said switching devices to a position P1, thereby connecting a pole of their respective battery unit to the battery chassis of their respective battery unit, upon disconnection, switching said connector and disconnector arrangement to a non-operative mode by
opening breaker devices thereby disconnecting said battery units from each other, and
switching said switching devices to a position, thereby connecting the battery chassis of each respective battery unit to ground.

14. The method for operating a connector and disconnector arrangement as claimed in claim 13, wherein said steps in said operative mode are performed in a synchronized manner.

15. The method for operating a connector and disconnector arrangement as claimed in claim 13, wherein said steps in said non-operative mode are performed in a synchronized manner.

16. The method for operating a connector and disconnector arrangement as claimed in claim 13, wherein said connector and disconnector arrangement further comprises DC breakers, and said method comprises the additional step of closing, in said operative mode, said DC breakers after said step of closing said breaker devices.

17. The method for operating a connector and disconnector arrangement as claimed in claim 13, wherein said connector and disconnector arrangement further comprises DC breakers, and said method comprises the additional step of opening, in said non-operative mode, said DC breakers prior to said step of opening said breaker devices.

* * * * *